(12) United States Patent
Ehn et al.

(10) Patent No.: US 8,316,146 B2
(45) Date of Patent: Nov. 20, 2012

(54) PEER-TO-PEER STREAMING OF MEDIA CONTENT

(75) Inventors: Andreas Ehn, Stockholm (SE); Magnus Hult, Stockholm (SE); Fredrik Niemelä, Stockholm (SE); Ludvig Strigeus, Göteborg (SE); Gunnar Kreitz, Stockholm (SE)

(73) Assignee: Spotify AB, Stockholm (SE)

( * ) Notice: Subject to any disclaimer, the term of this patent is extended or adjusted under 35 U.S.C. 154(b) by 224 days.

(21) Appl. No.: 11/777,534

(22) Filed: Jul. 13, 2007

(65) Prior Publication Data

US 2009/0019174 A1 Jan. 15, 2009

(51) Int. Cl.
*G06F 15/16* (2006.01)
(52) U.S. Cl. .................... 709/231; 709/217; 709/219
(58) Field of Classification Search .................. 709/231
See application file for complete search history.

(56) References Cited

U.S. PATENT DOCUMENTS

| | | | |
|---|---|---|---|
| 2004/0143672 A1* | 7/2004 | Padmanabham et al. | 709/231 |
| 2005/0097213 A1* | 5/2005 | Barrett et al. | 709/231 |
| 2005/0160177 A1* | 7/2005 | Kim | 709/231 |
| 2006/0050697 A1* | 3/2006 | Li et al. | 370/389 |
| 2006/0080454 A1* | 4/2006 | Li | 709/231 |
| 2006/0190615 A1* | 8/2006 | Panwar et al. | 709/231 |
| 2006/0224760 A1* | 10/2006 | Yu et al. | 709/231 |
| 2006/0230174 A1* | 10/2006 | Hoche et al. | 709/231 |
| 2009/0037968 A1* | 2/2009 | Liu et al. | 725/114 |
| 2010/0011103 A1* | 1/2010 | Luzzatti et al. | 709/226 |

OTHER PUBLICATIONS

Yanming Shen, Zhengye Liu, Shivendra S. Panwar, Keith W. Ross, Yao Wang, "Streaming Layered Encoded Video Using Peers", Jul. 2005, Polytechnic University, Brooklyn, NY 11201 USA.
European Search Report for EP08158835.2, Dated Sep. 17, 2008.
Xin Lui et al: "A peer-to-peer framework for cost-effective on-demand media streaming", Consumer Communications and Networking Conference, 2006, Las Vegas, Nevada, vol. 1, Jan. 8, 2006, pp. 314-318, XP010893222.
Magharei Nazanin et al: "Understanding Mesh-based Peer-to-Peer Streaming", Internet Citation, Nov. 23, 2006, XP002444978, Retrieved from URL:http://mirage.cs.uoregon.edu/pub/nossdav06. pdf, Retrieved Jul. 31, 2007.
European Office Action for EP Application No. 081588358.2 dated Oct. 6, 2010.

* cited by examiner

*Primary Examiner* — Kevin Bates
*Assistant Examiner* — Mohammed Ahmed
(74) *Attorney, Agent, or Firm* — Moore & Van Allen, PLLC; W. Kevin Ransom

(57) ABSTRACT

The invention relates to peer-to-peer streaming of media in a network for distribution of data. A handover function is configured to hand over the distribution of sub-streams to a client back and forth between two peers or between a peer and the central server, if at least one predefined condition is fulfilled.

6 Claims, 6 Drawing Sheets

PEER-TO-PEER STREAMING OF MEDIA CONTENT

BACKGROUND OF THE INVENTION

1. Field of the Invention

Figure 1:
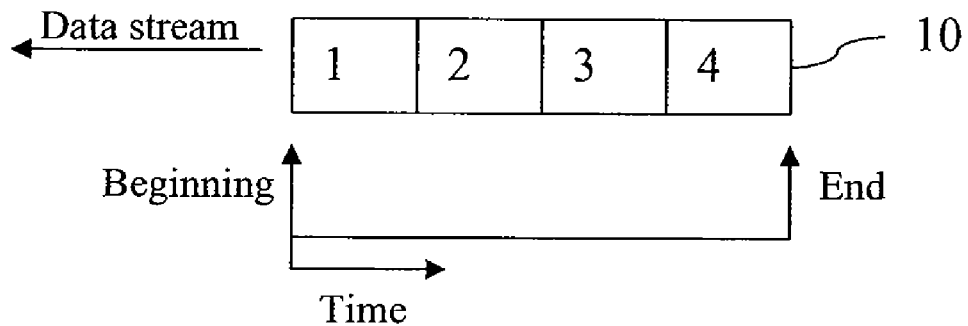

The present invention pertains to a method and system adapted to peer-to-peer streaming of media content in a network for distribution of data.

2. Description of Related Art

Today's solutions for media streaming being based on a client-server model are disadvantageous due to high bandwidth requirements on the server side. A reduction of these requirements would demand a peer-to-peer model for data distribution. However, the existing peer-to-peer systems are unsuitable for streaming for a number of reasons, for instance because data arrives unordered, and, in the typical case, it is not possible to start utilizing the received data packets until the final part of the streaming media has arrived. The media may here represent any kind of digital content, such as music, video, digital films or images.

Nodes (peers) in a peer-to-peer network may over time experience drastic changes in bandwidth availability, or even disappear completely. Moreover, the nodes may have asymmetric network connections, usually meaning that they have substantially higher downstream bandwidth than upstream bandwidth.

Hence, there is a need for an improved streaming-media distribution solution, which, on one hand, overcomes the above mentioned bandwidth requirements of the pure client-server model; and on the other hand, avoids the drawbacks of the existing peer-to-peer solutions.

BRIEF SUMMARY OF THE INVENTION

The present invention relates to the provision of streaming media from a central server and/or peers in a peer-to-peer network without bandwidth guarantees.

According to the invention, the network has a central server for streaming media content to clients.

According to the invention, the network has a central server for streaming media content to clients. Further, every peer has software for retrieval of a media stream from the central server and from other peers. The software is adapted to transmit sub-streams of streaming media to other peers when requested.

According to the invention, a first set of a first number of sub-streams is generated from an original data stream, wherein any combination of a second number of sub-streams selected from the first set may be recombined to yield the original data stream. Each sub-stream in the first set is here encoded in such a manner that a given sub-block from a selected sub-stream can be combined with corresponding sub-blocks from the other selected sub-streams to yield the given block of the original data stream. Moreover, the second number is larger than or equal to two and smaller than or equal to the first number.

According to an embodiment, played media streams are recoded in such a manner that different peers, having sub-streams of the same media stream in their memory, have randomly chosen sub-streams of that media stream, thus increasing the number of available redundant sub-streams in the network.

Further embodiments of the system of the present invention are set forth through the set of attached dependent system claims.

BRIEF DESCRIPTION OF THE SEVERAL VIEWS OF THE DRAWING(S)

Figure 2:
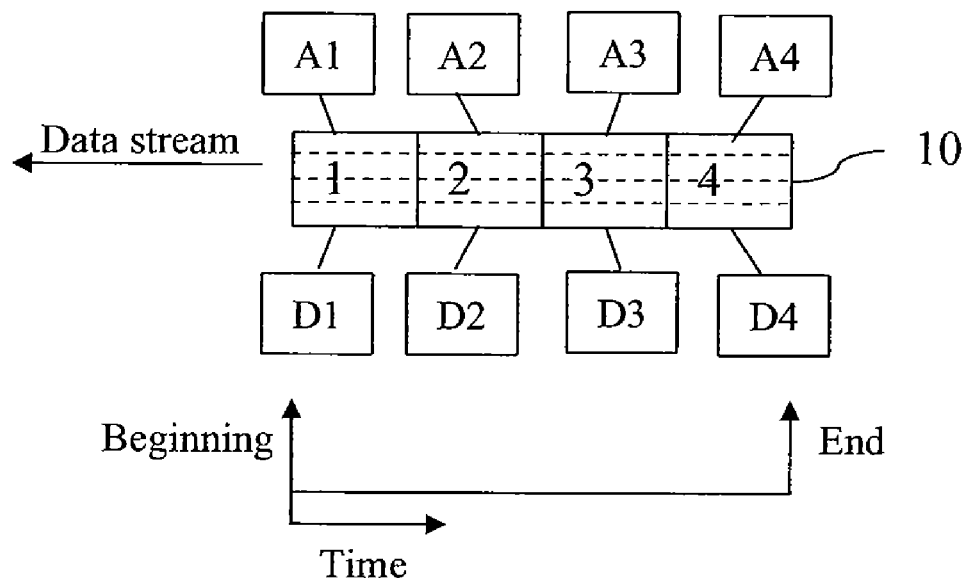
Figure 3:
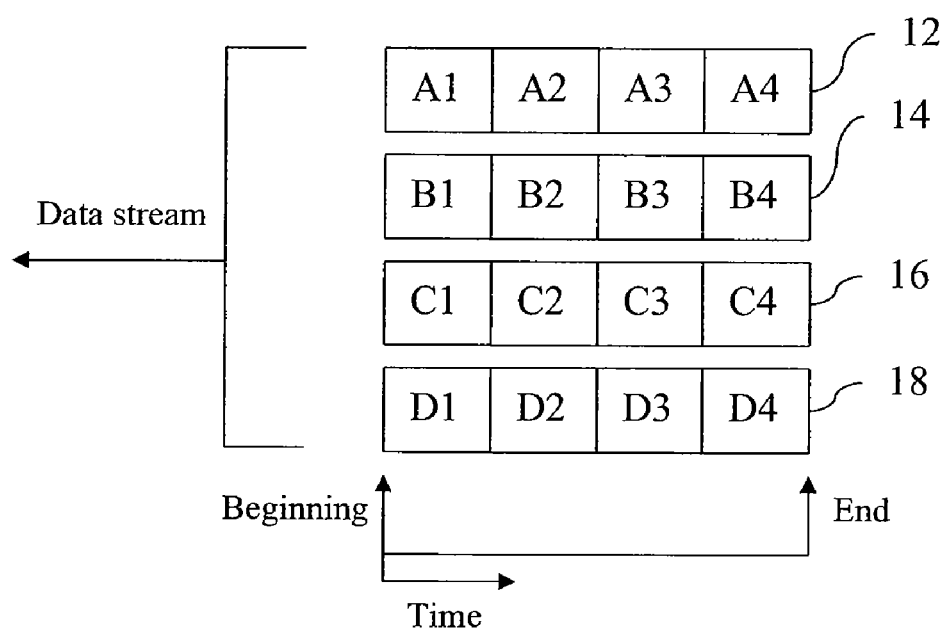
Figure 4:
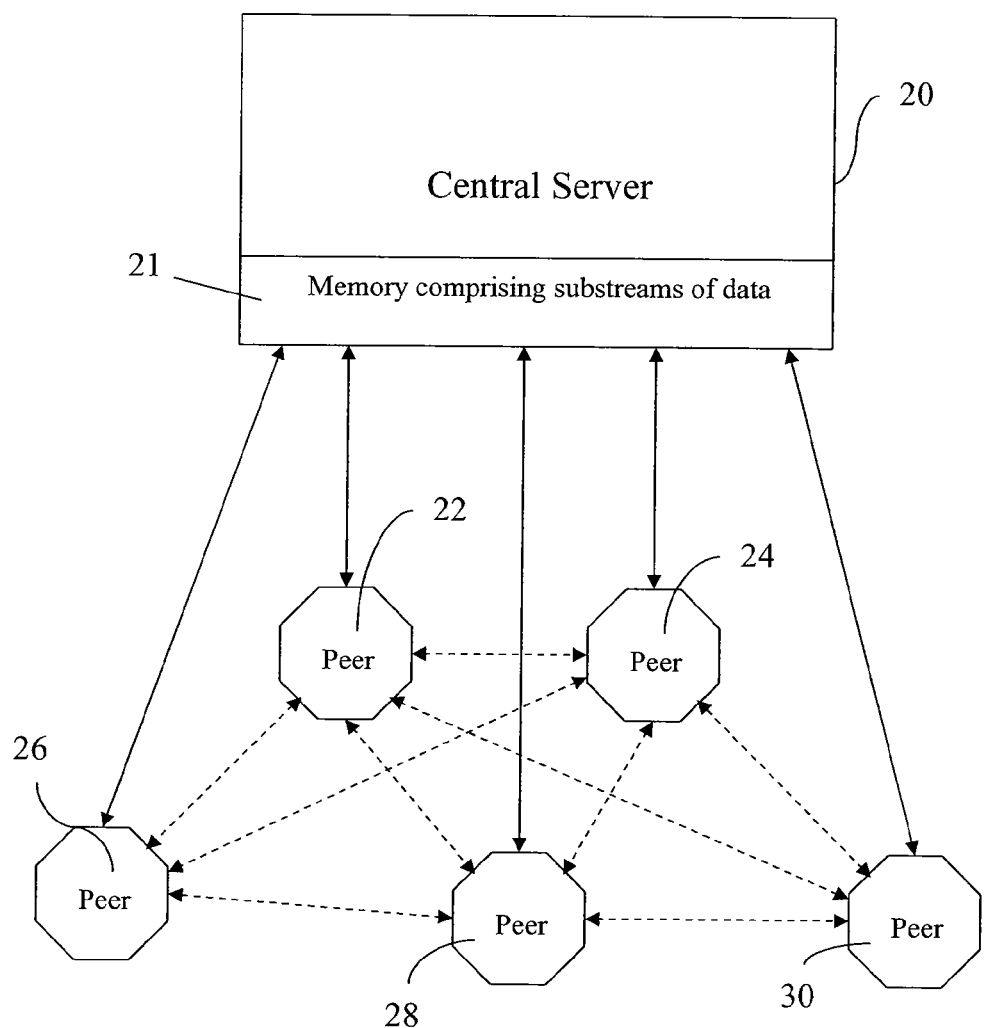
Figure 5:
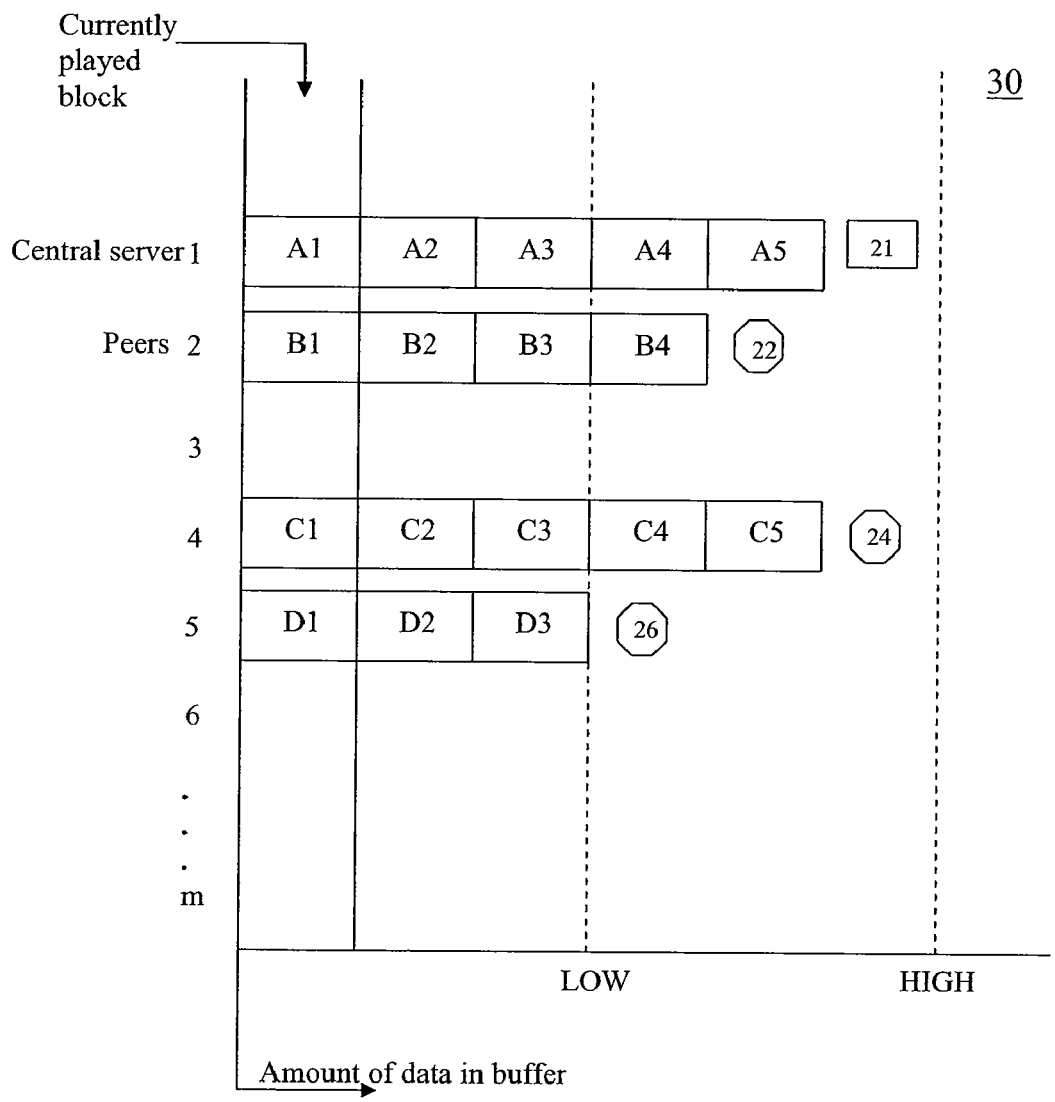
Figure 6:
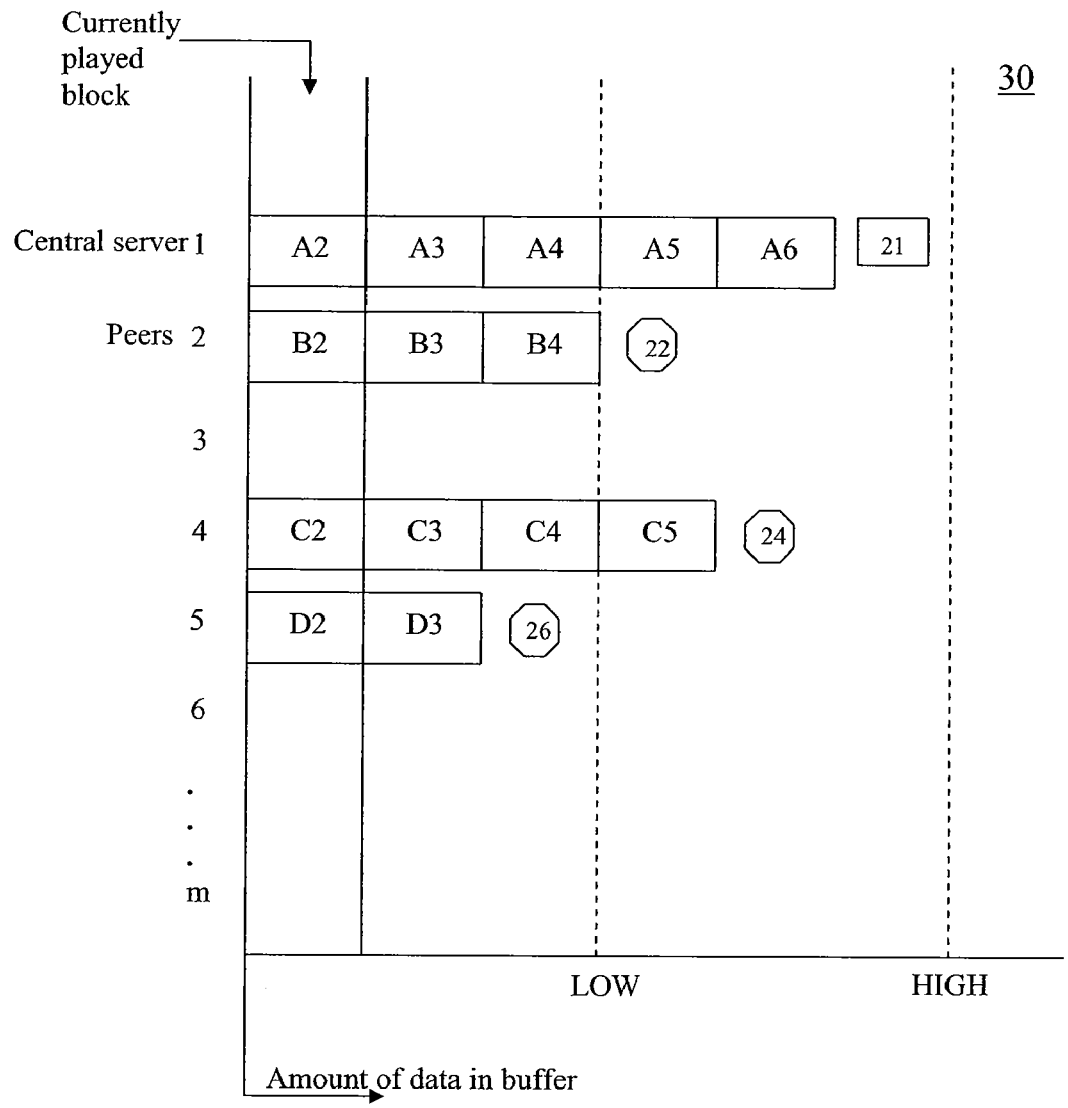
Figure 7:
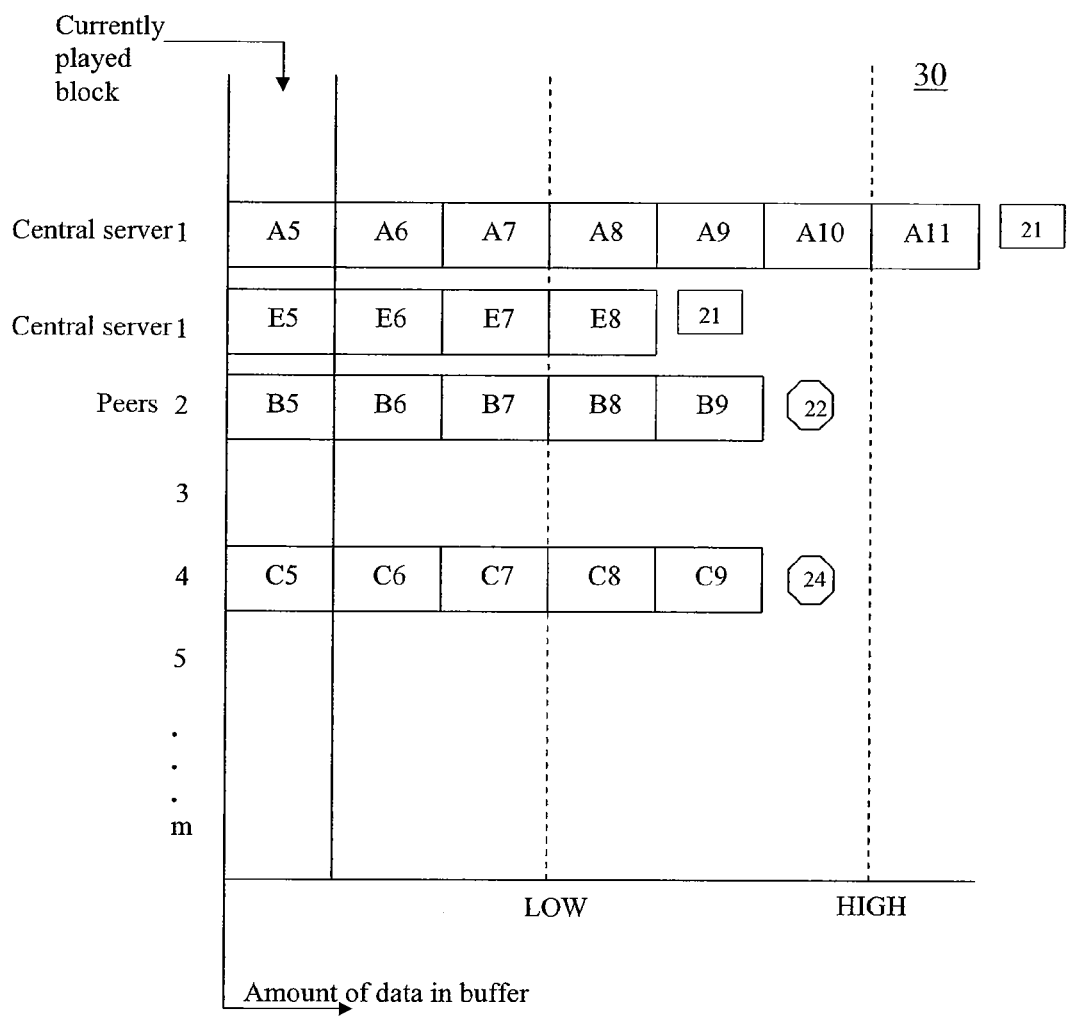

Henceforth reference is made the accompanied drawings and its related text, whereby the present invention is described through given examples and provided embodiments for a better understanding of the invention, wherein:

FIG. 1 schematically illustrates a prior-art embodiment of distributing streaming media;

FIG. 2 schematically illustrates how a conventional stream of streaming media in accordance with FIG. 1 is split lengthwise in sub-streams according to the present invention;

FIG. 3 schematically illustrates distribution sub-streams in accordance with FIG. 2 from a central server in accordance with the present invention;

FIG. 4 schematically illustrates a central server connected to a peer-to-peer network;

FIG. 5 schematically illustrates a buffer in client equipment receiving streaming media in accordance with the present invention;

FIG. 6 schematically illustrates updating of the streaming media in accordance with FIG. 5 of the present invention; and FIG. 7 schematically illustrates updating of the streaming media in accordance with FIG. 5 of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention introduces streaming media by splitting an original data stream length-wise, i.e., given only the first fraction of the parts in a stream of data, it is possible to recreate the first fraction of the original data stream. To achieve this, the invention provides a central server system with guaranteed bandwidth, and further provides a handover process, which allows a client to switch from retrieving data from its peers to the central system when required. By splitting the data length-wise, individual peers from which a given client is streaming media need only serve data as fast as the original bit-rate divided by the number of concurrent streams.

FIG. 1 schematically illustrates a prior-art embodiment of distributing streaming media 10. Throughout the present description streaming media is depicted as being divided into blocks denoted 1, 2, 3 etc. and length-wise split into sub-streams denoted A, B, C and D, each comprising the sub-blocks A1, A2, A3 etc., B1, B2, B3 etc., C1, C2, C3 etc. and D1, D2, D3 etc., in order to guide the reader through the teaching of the present invention. It is appreciated that the numbers of sub-streams and sub-blocks of data respectively are not limited to those given as examples herein.

Hence FIG. 1 depicts prior art streaming media blocks 10, labeled 1, 2, 3 and 4 respectively, being distributed from a server to a client. The blocks 10 are transmitted to a client downloading them in a flow from 1 to 4 until the stream ends. As mentioned above, existing peer-to-peer systems are unsuitable for streaming for a number of reasons, for instance data might arrive unordered, and in the typical case, it is not possible to start utilizing the received data packets until the final part of the streaming media has arrived.

Nodes (peers) in a peer-to-peer network may experience drastic changes in bandwidth availability or even disappear completely. Moreover, the nodes may have asymmetric network connections, which usually means that they have much higher downstream bandwidth than upstream ditto.

Hence, to solve existing problems, the present invention provides a method and a system consistent with what is depicted in FIG. 2 to FIG. 7.

FIG. 2 schematically illustrates how a conventional stream of media content 10 in accordance with FIG. 1 is regenerated from the four sub-streams A, B, C and D, consisting of sub-blocks A1-4, B1-4, C1-4 and D1-4 respectively in this example according to the present invention. The four sub-streams can be seen as constituting a length-wise split of the data stream, depicted as broken lines in FIG. 2.

FIG. 3 schematically illustrates distribution of sub-streams A, B, C and D—labeled 12, 14, 16 and 18 respectively—made up of interleaved sub-blocks of data A1, A2, A3, A4; B1, B2, B3, B4; C1, C2, C3, C4; and D1, D2, D3, D4 respectively from a central server in accordance with the present invention. The blocks of data may be individually obtained by a client from the central server, or from its peers. In any case, from the original data stream 10, a number of different sub-streams are generated by the central server and any client having the data stream in its memory. Any set of a smaller or equal number—in the present example, four—of different sub-streams can be recombined to yield the original data stream 10.

Each sub-stream is encoded in such a manner that the corresponding blocks of any combination of a given number—in the present example, four—of different sub-streams can be recombined to obtain the corresponding block of the original data stream. This is accomplished by a suitable algorithm for this purpose such as a Solomon-Reed-type of algorithm, or any other similar algorithm known to a person skilled in the art. The algorithm is thus implemented in software and hardware residing in the peer equipment for downloading media from other peers or from a central server.

FIG. 4 schematically illustrates a central server 20 storing the sub-streams 12, 14, 16, 18 in a memory area 21 for retrieval by peers 22, 24, 26, 28, 30 connected to the peer-to-peer network. Solid double arrows indicate communication between single peers with the central server 20 and vice versa, whereas broken-line double arrows designate communication between peers in the network. Every single peer 22, 24, 26, 28, 30 is provided the software mentioned to communicate with peers and the central server 20. The software also comprises a handover function that enables a peer to switch between receiving data streams from the central server and its peers.

Moreover, FIG. 4 schematically depicts the system of the present invention operated by the method described in here.

FIG. 5 schematically illustrates a buffer in client 30 equipment or in any peer equipment receiving streaming media in accordance with the present invention.

The number of possible sub-streams is higher than the number of sub-streams required to reconstruct the original data stream, and peers randomly choose among the possible sub-streams, which to generate. This increases the probability of different peers 22, 24, 26 having different sub-streams of the original streams wanted by the client 30, meaning that they can be utilized in conjunction by a client 30 retrieving a stream.

The stream of media played at a client 30 is depicted at the arrow pointing from a currently played block at the block played. It is possible to play a block i of the media if and only if all of the sub-blocks Ai, Bi, Ci and Di from the sub-streams A, B, C, and D are available in the buffer memory. The blocks must be played in order, beginning with 1 and then 2, 3 etc. If there are any sub-blocks missing for the block i, these blocks must be obtained before the block i can be played. In FIG. 5 it is currently possible to play blocks 1-3, since sub-blocks 1-3 of all sub-streams have been downloaded. To play block 4, however, sub-block D4 must be obtained. As for now in FIG. 5 it is seen that there is still enough data available for playback.

Every single sub-block can be concatenated in the correct order by the algorithm as described above, if they are stored/available in the buffer memory.

In FIG. 5 and according to the present invention there are defined two time constants: LOW and HIGH (see FIG. 5) depicted as vertical broken lines, related to the amount of buffered material that is yet un-played by the client 30.

When the media streaming is about to start, the client starts streaming a number—in the present example, four—of sub-streams, from the peer-to-peer network and, if necessary in order to ensure low latency at startup, in conjunction with the central server 20. This is depicted in FIG. 5, as one sub-stream A is fetched from the central server 20 memory 21, marked by a rectangle containing the number 21 in FIG. 5. Meanwhile peers 22, 24, 26 with the appropriate sub-streams B, C, D, marked in an octagon with the peer's reference numeral from where the stream was fetched, are located via the software residing in participating peer equipment for downloading streaming media according to the present invention in the peer-to-peer network.

FIG. 6 schematically illustrates updating of the streaming media in accordance with FIG. 5 of the present invention where it can be seen that the amount of sub-stream data being downloaded from peer 26 in the client buffer has fallen below the LOW constant. Hence, the situation requires faster communication in order to fetch sub-block number 4, which is now accomplished by, instead of fetching D4 from peer 26, fetching sub-block 4 of another sub-stream from the central server memory 21 through a handover to the same.

Whenever a sub-stream downloaded from the peer-to-peer network, for example sub-stream D, as depicted in FIG. 6, has less than LOW constant data buffered, downloading of that sub-stream is halted and replaced by downloading of another sub-stream from the central server 20 memory 21.

The sub-blocks A2, B2, C2, D2 of block 2 being played by the client equipment are now stored in a memory/cache by the client 30 software, as are all the sub-blocks of block 3. Sub-block D4 of block 4, however, has not yet been fetched from peer 26, causing sub-stream D to fall below the LOW constant. As such is the case, the peer software hands over/switches the fetching of streaming media to the central server 20 memory 21 in order to restore the buffer level of the fourth sub-stream. This replacement sub-stream is depicted in FIG. 7 as sub-stream D.

FIG. 7 schematically illustrates updating of the streaming media in accordance with FIG. 5 of the present invention where it can be seen that the amount of sub-stream data of sub-stream A being downloaded from the central server 20 memory 21 in the client buffer has risen above the HIGH constant. Hence, the situation is here the opposite of the situation illustrated in FIG. 6, and download of sub-stream A can seize, being replaced by download of another sub-stream from a peer through a handover to the same.

Whenever a sub-stream downloaded from the central server 20 has more than HIGH data buffered, downloading of that sub-stream is halted and replaced by downloading of another sub-stream from the peer-to-peer network, which is the case illustrated in FIG. 7. This figure shows that buffer memory stored sub-blocks A5-A11 of sub-stream A exceed the high buffer level. As such is the case, the peer software hands over/switches the fetching of streaming media to a suitable peer in order to preserve central server bandwidth.

The method and system of the present invention ensure to a greater degree than existing peer-to-peer solutions data distribution characteristics suitable for streaming media, and allow for lower server bandwidth consumption than existing client-server based streaming solutions.

A possible optimization is to make sure that there is never more than one connection to the central server 20. This is accomplished by blockwise interleaving the streams, see FIG. 3, that are concurrently being downloaded from the central server and treating the LOW constant as if it were set to the position of the central server 20 download whenever there is such a download. If there are no peers having sub-streams to provide the client 30, all sub-streams are of course fetched from the central server 20 memory 21.

The collective content of the peer-to-peer network is the content of data caches of the peers. While retrieving sub-streams, the original data is recreated in real-time for play-back. Having played back a block, the client recodes the block as the sub-blocks of a number of new randomly chosen sub-streams, which are stored in the client's data cache. This means that the distribution of sub-streams in the peer-to-peer network is kept optimal. As an example blocks can be arbitrarily recoded for instance, block 1 to A1, D1, F1 and T1.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for distribution of data in a network based on peer-to-peer streaming of media content, the network including a plurality of peers and a central server, the method including:
    encoding, at the central server, an original stream of media content into a first number of different sub-streams, wherein each sub-stream in the first number of sub-streams comprises a plurality of sub-blocks, each sub-stream being encoded in a manner that any given sub-block from a selected sub-stream can be combined with certain corresponding sub-blocks from other sub-streams to yield the original stream, wherein such sub-blocks combine to form a second number of sub-streams that can be combined to obtain the original stream, wherein the second number of different sub-streams is greater than one and less than the first number of sub-streams;
    retrieving, at at least one peer, a number of sub-streams equivalent to the second number of sub-streams from the central server and a number of the other peers, wherein each of the retrieved sub-streams is different from the other retrieved sub-streams;
    transmitting, by at least one peer, and on request, a sub-stream to another peer;
    replacing downloading of a sub-stream from one of the peers with downloading of another, different or identical, sub-stream from the central server, or from another of the peers, when it is determined that the amount of sub-stream data from said one of the peers is below a predefined amount of data in a reception buffer, wherein said another sub-stream is chosen such that each sub-stream of the retrieved sub-streams is different from the other sub-streams in the retrieved sub-streams; and
    replacing downloading of a sub-stream from the central server with downloading of another, different or identical, sub-stream from one of the peers, when a predefined condition is fulfilled.

2. The method of claim 1, wherein the predefined condition is fulfilled when it is determined that the sub-stream from the central server is above a predefined amount of data in the reception buffer.

3. The method of claim 1, wherein the sub-streams retrieved by at least one peer form the encoded stream of media content, the method including:
    recoding the stream of media content in such a manner that different peers, storing sub-streams of the same media stream, have randomly chosen sub-streams of that media stream.

4. A system for distribution of data in a network based on peer-to-peer streaming of media content, the system including
    a central server for distribution of streaming media content to a plurality of peers, the central server being configured to encode an original stream of media content into a first number of different sub-streams, wherein each sub-stream in the first number of sub-streams comprises a plurality of sub-blocks, each sub-stream being encoded in a manner that any given sub-block from a selected sub-stream can be combined with certain corresponding sub-blocks from other sub-streams to yield the original stream, wherein such sub-blocks combine to form a second number of sub-streams that can be combined to obtain the original stream, wherein the second number of different sub-streams is greater than one and less than the first number of sub-streams; and
    a plurality of peers, each peer being configured to:
    retrieve a number of sub-streams equivalent to the second number of sub-streams from the central server and a number of the other peers, wherein each of the retrieved sub-streams is different from the other retrieved sub-streams;
    transmit, on request, a sub-stream to another of the peers;
    replace downloading of a sub-stream from one of the peers with downloading of another, different or identical, sub-stream from the central server, or from another of the peers, when it is determined that the amount of sub-stream data from said one of the peers is below a predefined amount of data in a reception buffer, wherein the peer is configured to choose said another sub-stream such that each sub-stream of the retrieved sub-streams is different from the other sub-streams in the retrieved sub-streams, and
    replace downloading of a sub-stream from the central server with downloading of another, different or identical, sub-stream from one of the peers, when a predefined condition is fulfilled.

5. The system of claim 4, wherein the predefined condition is fulfilled when it is determined that the sub-stream from the central server is above a predefined amount of data in the reception buffer.

6. The system of claim 4, wherein the sub-streams retrieved by at least one peer form the encoded stream of media content, the at least one peer being further configured to:
    recode the stream of media content in such a manner that different peers, storing sub-streams of the same media stream, have randomly chosen sub-streams of that media stream.

* * * * *